Patent text begins

3,037,002
POLYMERIZATION OF CAPROLACTAM WITH AMINO ACIDS AND THE PRODUCTS THEREFROM

Edward W. Pietrusza, Glenn A. Nesty, and Rudolph Pinter, Morristown, N.J., assignors to Allied Chemical Corporation, New York, N.Y., a corporation of New York
No Drawing. Filed Jan. 14, 1959, Ser. No. 786,690
5 Claims. (Cl. 260—78)

This invention relates to the polymerization of caprolactam with aromatic and alicylic amino acids and the products derived therefrom.

Numerous compounds have been suggested for use as catalysts in the polymerization of caprolactam. The most effective of these heretofore suggested are the many alkali salts, as for example, lithium or sodium hydride, potassium, sodium, or calcium carbonates, barium hydroxide, calcium hydroxide, etc. and the mineral acids, as for example, phosphoric, sulfuric, hydrochloric acids and the organic acids, such as acetic acid, propionic acid, oxalic acid, toluene sulfonic acid, benzoic acid and many others. Although these materials have been proven to be operative, each of them affects the reaction in an undesirable manner. The compound may, for example, be an excellent catalyst but also an excellent chain terminator thereby limiting the degree of polymerization, or the compound may be a good catalyst but undesirable in that it cannot be removed from the end product, thereby imparting to it undesirable degradative effects. Finally the compound may possess activity without undesirable side effects, but may be too slow in its action to be of commercial value.

It is accordingly an object of this invention to provide catalysts for the polymerization of caprolactam which possess sufficient activity to be of commercial value but which do not produce any undesirable reactions, such as unwanted chain termination, degradative effects or discoloring.

It is a further object of this invention to provide catalysts which will not only catalyze the reaction but will have the ability to copolymerize with the parent substance without deleteriously affecting the properties of the parent polymer.

A further object of this invention is to provide catalysts which do not requrie the additional presence of water.

A further object of this invention is to provide copolyamide compositions that can be melt-spun into fibers possessing superior tensile properties, and with melt points higher than the parent polycapramide; also to provide a copolyamide composition with enhanced stability at elevated temperatures.

It has now been found that these objects and other advantages incidental thereto can be attained with the use of a mono substituted methylamine in which the substituent is a 6-carbon ring free from aliphatic unsaturation joined to the methyl carbon and containing on a ring carbon a single carboxyl group, the longest chain joining the amine nitrogen and the carboxyl group containing from 9 to 13 total atoms.

It has been found that these amino acids as initiators and/or catalysts for the polymerization of caprolactam are sufficiently active to be of a commercial value. They do not terminate polymerization of the caprolactam and therefore can be used in the manufacture of both spinning and molding grade polymers. Furthermore, they are completely incorporative with caprolactam and therefore, after having performed their function as catalysts, disappear by copolymerizing with the parent monomer without deleteriously affecting its properties, and may be effectively used with anhydrous caprolactam. These characteristics make these high-melting "non-volatile" compounds particularly desirable for use in a continuous polymerization process. Furthermore, it has been found that the copolymeric compositions formed by the reaction with caprolactam of these acids, particularly benzylamine-4-carboxylic acids, in percentages varying from 1–99% are of considerable commercial value and that the compositions containing 20–50% by weight of the amino acid, particularly that mentioned above, have substantially higher heat stability, higher tensile modulus and higher melting point properties than the caprolactam homopolymers.

The mono substituted methylamine carboxylic acids of the invention are distinguishable from other amino acids in that they appear to satisfy the following requirements for a good catalyst and initiator for polymerization of caprolactam (1) they do not cyclize and form stable end-groups (—chain termination), (2) they are practically neutral but tend to be slightly on the basic side (3) both functional groups, i.e., the amino and carboxylic acid group, are of sufficient strength to enable smooth co-polymerization with the parent monomer (4) the mono substituted methylamine carboxylic acids are similar to omega amino caproic acid in molecular structure so that they fit into the framework of the parent polymer and thereby become incorporative (5) the amino grouping is not attached directly to a ring structure.

Examples of the invention include the following: benzyl amine-4-carboxylic acid and its monohydrate salt, amino methyl cyclohexane-4-carboxylic acid, and benzyl amine-3-carboxylic acid.

While other amino acids have molecular structures which are somewhat similar to omega amino caproic acid, they do not meet all of these requirements and consequently fail to meet the high standards which distinguish these catalysts and initiators from those of the prior art.

EXAMPLE 1

Four parts by weight of benzyl amine-4-carboxylic acid was introduced with an initial charge of 400 parts of ε-caprolactam and 40 parts of water into a reaction vessel, provided with a condenser and an agitator. The mixture was well mixed in a nitrogen atmosphere and brought to a temperature of 90° C. after which the temperature was raised to between 200° and 210° at atmospheric pressure in three hours while cooling the condenser with cold water. The temperature was held at this point for an additional hour whereupon steam was substituted for the cold water as the coolant in the condenser and the temperature brought up to 260° C. at atmospheric pressure in about 2½ hours and maintained at 260° C. and atmospheric pressure for 10 hours. The course of the polymerization was observed by periodically withdrawing samples and measuring viscosity of unwashed samples after the temperature had been raised to 260° C. Viscosity measurements were made in m-cresol at a 0.50% concentration at 25° C.

The above example was repeated, varying only the amount of benzyl amine-4-carboxylic acid introduced. The resuliting viscosity measurements obtained are set forth in the following table:

*Benzyl Amine-4-Carboxylic Acid*

| Conc. BA-4-CA,[1] Wt. Percent | Reduced Viscosity = $N_R$ after Following Number of Hours on Temp. (260° C.) | | | | | |
|---|---|---|---|---|---|---|
| | 0 | 2 | 4 | 6 | 8 | 10 |
| 0.00 | <0.10 | <0.20 | 0.72 | 1.08 | 1.34 | 1.52 |
| 0.25 | 0.52 | 1.08 | 1.45 | 1.63 | 1.82 | 1.97 |
| 0.50 | 0.85 | 1.36 | 1.64 | 1.93 | 2.20 | 2.48 |
| 1.00 | 1.06 | 1.56 | 1.91 | 2.17 | 2.39 | 2.57 |
| 10.00 | | 1.08 | 1.36 | | | |
| 20.00 | | 1.11 | 1.29 | | | |
| 30.00 | | | 1.30 | | | |
| 40.00 | | | 1.25 | | | |

[1] Introduced as its monohydrate salt. The reduced viscosity, $N_R$ = (Time of efflux of solution divided by time of efflux of solvent from same orifice) −1, all divided by concentration of solution expressed as grams of polymer per 100 cc. of solvent.

The relation of average molecular weight to reduced viscosity is given by the equation of H. Staudinger and H. Schnell (Makromolekulare Chemie of 1947, vol. 1, pages 44–60):

Average molecular weight = $N_R \times 13,500$

Thus, average molecular weight of the polymer with an $N_R$ value of 2.57 is about 34,700.

EXAMPLE 2

This example was carried out by the procedure of Example 1 except that aminomethyl cyclohexane-4-carboxylic acid was used in the place of benzyl amine-4-carboxylic acid.

The reduced viscosity measurements obtained with the use of aminomethyl cyclohexane-4-carboxylic acid are set forth in the following table:

*Aminomethyl Cyclohexane-4-Carboxylic Acid*

| Conc. AMC-4-CA, Wt. Percent | Reduced Viscosity after Following Number of Hours on Temp. (260° C.) | | | | | |
|---|---|---|---|---|---|---|
| | 0 | 2 | 4 | 6 | 8 | 10 |
| 0.00 | <0.10 | <0.20 | 0.72 | 1.08 | 1.34 | 1.52 |
| 0.25 | 0.37 | 0.95 | 1.33 | 1.65 | 1.94 | 2.21 |
| 0.50 | 0.55 | 1.09 | 1.49 | 1.74 | 1.98 | 2.12 |
| 1.00 | 0.87 | 1.33 | 1.53 | 1.69 | 1.84 | 1.99 |
| 10.00 | | | 1.42 | | | |
| 20.00 | | | 1.41 | | | |
| 30.00 | | | 1.43 | | | |
| 40.00 | | | 1.50 | | | |

EXAMPLE 3

This example was carried out by the procedure of Example 1 except that benzyl amine-3-carboxylic acid was used in place of benzyl amine-4-carboxylic acid.

The reduced viscosity measurements obtained with the use of benzyl amine-3-carboxylic acid are set forth in the following table:

*Benzyl Amine-3-Carboxylic Acid*

| Conc. BA-3-CA, Wt. Percent | Reduced Viscosity after Following Number of Hours on Temp. (260° C.) | | | | | |
|---|---|---|---|---|---|---|
| | 0 | 2 | 4 | 6 | 8 | 10 |
| 0.00 | <0.10 | <0.20 | 0.72 | 1.08 | 1.34 | 1.52 |
| 0.25 | 0.89 | 1.32 | 1.65 | 1.90 | 2.07 | 2.37 |
| 0.50 | 0.83 | 1.28 | 1.52 | 1.74 | 1.97 | 2.22 |
| 1.00 | 0.93 | 1.33 | 1.56 | 1.77 | 1.85 | 2.17 |
| 10.00 | | | 1.18 | | | |
| 20.00 | | | 1.21 | | | |
| 30.00 | | | 1.02 | | | |
| 40.00 | | | 0.90 | | | |

EXAMPLE 4

Four parts by weight benzyl amine-4-carboxylic acid as its monohydrate salt was introduced with an initial charge of 400 parts of anhydrous ε-caprolactam into a reaction vessel provided with a condenser and agitator. The mixture was well mixed in a nitrogen atmosphere and brought to a temperature of 90° C. after which the temperature was raised to between 200 and 210° C. at atmospheric pressure in three hours while cooling the condenser with cold water. The temperature was held at this point for an additional hour whereupon steam was substituted for the cold water as the coolant in the condenser and the temperature brought up to 260° C. at atmospheric pressure is about 2½ hours and maintained at 260° C. atmospheric pressure for 10 hours. The course of the polymerization was observed by a periodic withdrawal of unwashed samples and viscosity measurements after the temperature had been raised to 260° C. Viscosity measurements were made in m-cresol at a 0.50% concentration at 25° C.

The above experiment was repeated, varying only the amount of benzyl amine-4-carboxylic acid introduced. The resulting viscosity measurements obtained are set forth in the following table:

| Conc. Benzyl Amine-4-carboxylic Acid,[1] wt. percent | Reduced Viscosity after Following Number of Hours on Temp. (260° C.) | | | | | |
|---|---|---|---|---|---|---|
| | 0 | 2 | 4 | 6 | 8 | 10 |
| 0.00 | 0.0 | 0.0 | 0.0 | 0.0 | 0.0 | 0.03 |
| 1.00 | | | 0.10 | | | |
| 3.00 | 0.88 | 1.22 | 1.40 | 1.52 | 1.62 | 1.75 |
| 10.00 | 0.73 | 1.27 | 1.58 | 1.88 | 2.12 | 2.31 |
| 30.00 | | | 1.22 | | | |

[1] Introduced as its monohydrate salt.

From the above examples it can be seen that if water is used as an initiator of the reaction only trace amounts of these amino acids are required to effect rapid polymerization of caprolactam. The best polymerization rates (1 to 3 hours heat-up, and 0.00 to 5 hours on temperature) are obtained with amino acid concentrations of 0.25 to 1% in the presence of about 10% of water. When water is not used as an initiator, the best rates are obtained with amino acid concentrations of about 3% to about 10%. At these reaction rates spinning grade polymers can be obtained after about 0.00 to 1 hour on temperature with a heat-up time of 1 to 3 hours. If chain termination is desired, it can be realized by introducing steam. High molecular weight molding grade polymers can be obtained after 5 to 10 hours on temperature with 1 to 3 hours heat-up, provided a good inert gas sweep of nitrogen or carbon dioxide is utilized. It is noteworthy that these amino acids function as catalysts and initiators in the early stages of the polymerization, and then disappear by incorporation with the parent polymer. Consequently, after a certain time elapse, molecular weight cannot be expected to increase due to their presence since in a sense they are "swallowed" into the framework of the polymer. Molecular weight increase thereafter is effected by the dehydrating affects of gas sweep, or reduced pressure.

When aminomethyl cyclohexane-4-carboxylic acid or benzylamine-3-carboxylic acid is used as the catalyst in the polymerization of anhydrous caprolactam, good polymerization rates are obtainable with concentrations of the amino acid between 3% and 10% by weight, substantially as shown in Example 4 for the benzylamine-4-carboxylic acid monohydrate. It has furthermore been found that these catalysts do not terminate polymerization of the caprolactam and therefore can be used advantageously in the manufacture of both spinning and molding grade polymers.

The following tables illustrate the typical fiber properties and spinning results of some of the copolyamides obtained when larger amounts of the amino acids were used in the production of copolymers using the method of Example 1.

| Polyamide Composition, Wt. percent | Polyamide, M.P., °C. | Fiber, Denier | Instron | | Initial Tensile Modulus, g./d. |
|---|---|---|---|---|---|
| | | | U.E., percent | U.T.S., g./d. | |
| Benzyl Amine-4-Carboxylic Acid/Caprolactam: | | | | | |
| 100/0 | >370 | | Non-spinnable | | |
| 50/50 | 283 | 67 | 15 | 3.4 | 56 |
| 45/55 | 271 | 87 | 23 | 5.3 | 60 |
| 40/60 | 248 | 135 | 24 | 5.7 | 60 |
| 35/65 | 231 | 118 | 21 | 5.4 | 62 |
| 30/70 | 217 | 248 | 25 | 6.0 | 53 |
| 20/80 | 209 | 97 | 27 | 5.8 | 50 |
| 10/90 | 212 | 167 | 29 | 6.0 | 46 |
| 0/100 (NO) | 222 | 123 | 19 | 5.7 | 30–41 |
| Aminomethyl Cyclohexane-4-Carboxylic Acid/Caprolactam: | | | | | |
| 100/0 | >370 | | Non-spinnable | | |
| 40/60 | 248 | 69 | 24 | 5.9 | 51 |
| 30/70 | 227 | 75 | 23 | 5.6 | 41 |
| 20/80 | 222 | 71 | 27 | 6.3 | 43 |
| 10/90 | 218 | 87 | 25 | 7.1 | 36 |
| 0/100 (NO) | 222 | 123 | 19 | 5.7 | 30–41 |

When monofilament samples of these copolymers were wound on plastic spools and placed in an air circulating oven for 24 hours at 165° C., and tested the following results were obtained. The "NO" signifies a non-catalyzed polycapramide, polymerized in the presence of 10% water.

| Polymer | Original | | | | Final | | | | Percent U.S.T. retained |
|---|---|---|---|---|---|---|---|---|---|
| | Den. | U.E., percent | U.T.S., g./d. | T.M., g./d. | Den. | U.E., percent | U.T.S., g./d. | T.M., g./d. | |
| 10% BA-4-CA | 167 | 29.0 | 6.04 | 46.4 | 152 | 14.4 | 4.26 | 59 | 70 |
| 20% BA-4-CA | 97 | 26.7 | 5.81 | 50.0 | 85 | 15.6 | 4.56 | 55 | 79 |
| 30% BA-4-CA | 94 | 21.3 | 5.80 | 54.0 | 112 | 19.4 | 5.45 | 58 | 94 |
| 40% BA-4-CA | 135 | 23.7 | 5.65 | 60.2 | 142 | 16.4 | 4.15 | 60 | 73 |
| 10% AMC-4-CA | 87 | 25.5 | 7.13 | 36.4 | 84 | 9.8 | 2.58 | 50.1 | 36 |
| 20% AMC-4-CA | 71 | 27.3 | 6.26 | 42.8 | 72 | 10.1 | 2.47 | 51.6 | 39 |
| 30% AMC-4-CA | 75 | 22.9 | 5.62 | 40.8 | 70 | 9.9 | 2.14 | 50.8 | 38 |
| 40% AMC-4-CA | 69 | 24.4 | 5.95 | 51.2 | 67 | 10.1 | 1.88 | 59 | 32 |
| Nylon-6-"NO" | 123 | 19.0 | 5.71 | 41.4 | 127 | 6.3 | 2.07 | 58 | 36 |

The polyamides derived from the reaction of 20–50% by weight of benzyl amine-4-carboxylic acid with caprolactam are particularly well suited for fiber spinning and tire cord use. The approximate range of suitable molecular weight for these materials lies within the range of 7–30,000.

The polyamides derived from the reaction of 20–50% by weight of benzyl amine-3-carboxylic acid, and amino methyl cyclohexane-4-carboxylic acid with caprolactam are particularly well adapted for use in extrusion injection molding and as a "plastic" film or coating. The approximate range of suitable molecular weights for these materials is slightly higher extending up to about 50,000.

Although certain preferred embodiments of the invention have been disclosed for purpose of illustration, it will be evident that various changes and modifications may be made therein without departing from the scope and spirit of the invention.

We claim:

1. The process for polymerizing caprolactam comprising heating said lactam at temperatures in the range between about 180° and about 300° C. at pressures not substantially exceeding atmospheric in the absence of substantial elemental oxygen and of more than about 1% total water in the presence of 0.25% to 10% by weight of the mixture of benzlamine-3-carboxylic acid, continuing said heating at least until a polymer product has an average molecular weight above about 5000.

2. The process for polymerizing caprolactam comprising introducing said lactam into a reaction vessel along with about 10% by weight of water, heating said lactam at temperatures in the range between about 180° and about 300° C. at pressures not substantially exceeding atmospheric in the presence of 0.25 to 1% by weight of benzyl amine-3-carboxylic acid, continuing said heating at least until a polymer product has an average molecular weight above about 5000.

3. The process for polymerizing caprolactam comprising heating said lactam at temperatures in the range between about 180° and about 300° C. at pressures not substantially exceeding atmospheric in the presence of 20–50% by weight of benzyl amine-3-carboxylic acid, continuing said heating at least until a polymer product has an average molecular weight between about 5000 and 50,000.

4. A two component linear copolyamide of benzyl amine-3-carboxylic acid and caprolactam.

5. A two component linear copolyamide of benzyl amine-3-carboxylic acid and caprolactam in which 20–50% by weight of the copolyamide is derived from benzyl amine-3-carboxylic acid.

References Cited in the file of this patent

UNITED STATES PATENTS

| 2,868,769 | Graham | Jan. 13, 1959 |
| 2,910,457 | Temin et al. | Oct. 27, 1959 |